(12) United States Patent
Herrick

(10) Patent No.: US 7,909,280 B1
(45) Date of Patent: Mar. 22, 2011

(54) FISHING REEL WINDING APPARATUS

(76) Inventor: Richard P. Herrick, Miramar, FL (US)

( * ) Notice: Subject to any disclaimer, the term of this patent is extended or adjusted under 35 U.S.C. 154(b) by 0 days.

(21) Appl. No.: 12/322,099

(22) Filed: Jan. 29, 2009

Related U.S. Application Data

(60) Provisional application No. 61/006,712, filed on Jan. 29, 2008.

(51) Int. Cl.
*A01K 89/01* (2006.01)
(52) U.S. Cl. .................. 242/323; 242/250; 43/21
(58) Field of Classification Search ............ 242/323, 242/225–227, 250, 251, 257; 43/21
See application file for complete search history.

(56) References Cited

U.S. PATENT DOCUMENTS

| | | | | |
|---|---|---|---|---|
| 3,869,832 A * | 3/1975 | Atwater | ............. | 451/358 |
| RE29,108 E * | 1/1977 | Atwater | ............. | 451/358 |
| 4,410,311 A * | 10/1983 | Hennessy | .......... | 464/17 |
| 4,951,890 A * | 8/1990 | Sossamon | ........... | 242/486.8 |
| 4,962,901 A * | 10/1990 | Shirley et al. | .......... | 242/323 |
| 5,190,237 A * | 3/1993 | Fagan | ............ | 242/390.8 |
| 5,394,815 A * | 3/1995 | Hansen | ............ | 114/109 |
| 6,015,111 A * | 1/2000 | Berke | ............ | 242/394 |
| 6,126,104 A * | 10/2000 | Kellerman | .......... | 242/225 |
| 6,550,712 B1 * | 4/2003 | Peterpaul | .......... | 242/390.8 |
| 6,685,125 B1 * | 2/2004 | Tucci | ............ | 242/390.8 |
| 7,073,740 B2 * | 7/2006 | Westhoff | .......... | 242/225 |
| 7,086,622 B1 * | 8/2006 | Whaley | .......... | 242/323 |
| 7,112,015 B2 * | 9/2006 | Roberts et al. | ........ | 408/97 |
| 7,309,039 B1 * | 12/2007 | Stone et al. | .......... | 242/225 |
| 7,600,327 B2 * | 10/2009 | Sharp | ............ | 33/769 |
| 2003/0168546 A1* | 9/2003 | Bankston | .......... | 242/390.8 |
| 2004/0240951 A1* | 12/2004 | Roberts et al. | ........ | 408/127 |
| 2005/0191139 A1* | 9/2005 | Hofbrucker et al. | .... | 408/239 A |

* cited by examiner

*Primary Examiner* — Evan H Langdon
(74) *Attorney, Agent, or Firm* — Oltman, Flynn & Kubler

(57) ABSTRACT

A fishing reel winding apparatus for use with a fishing reel includes a spool-retaining structure in which a spool is mounted and the spool connects to a spool handle hub from which a spool winding handle radially extends for removably interconnecting a fishing reel winding handle and the chuck of an electric drill, so that operation of the electric drill rotates the chuck and the reel to wind fishing line onto the spool, the fishing reel winding apparatus including: a chuck gripping stem for insertion into and engagement by a drill chuck and a handle hub engagement assembly drivably connected to the chuck gripping stem. The handle hub engagement assembly preferably includes a hub receiving cup having a cup side wall with a lateral handle receiving notch and a cup bottom wall drivably connected to the chuck gripping stem.

4 Claims, 3 Drawing Sheets

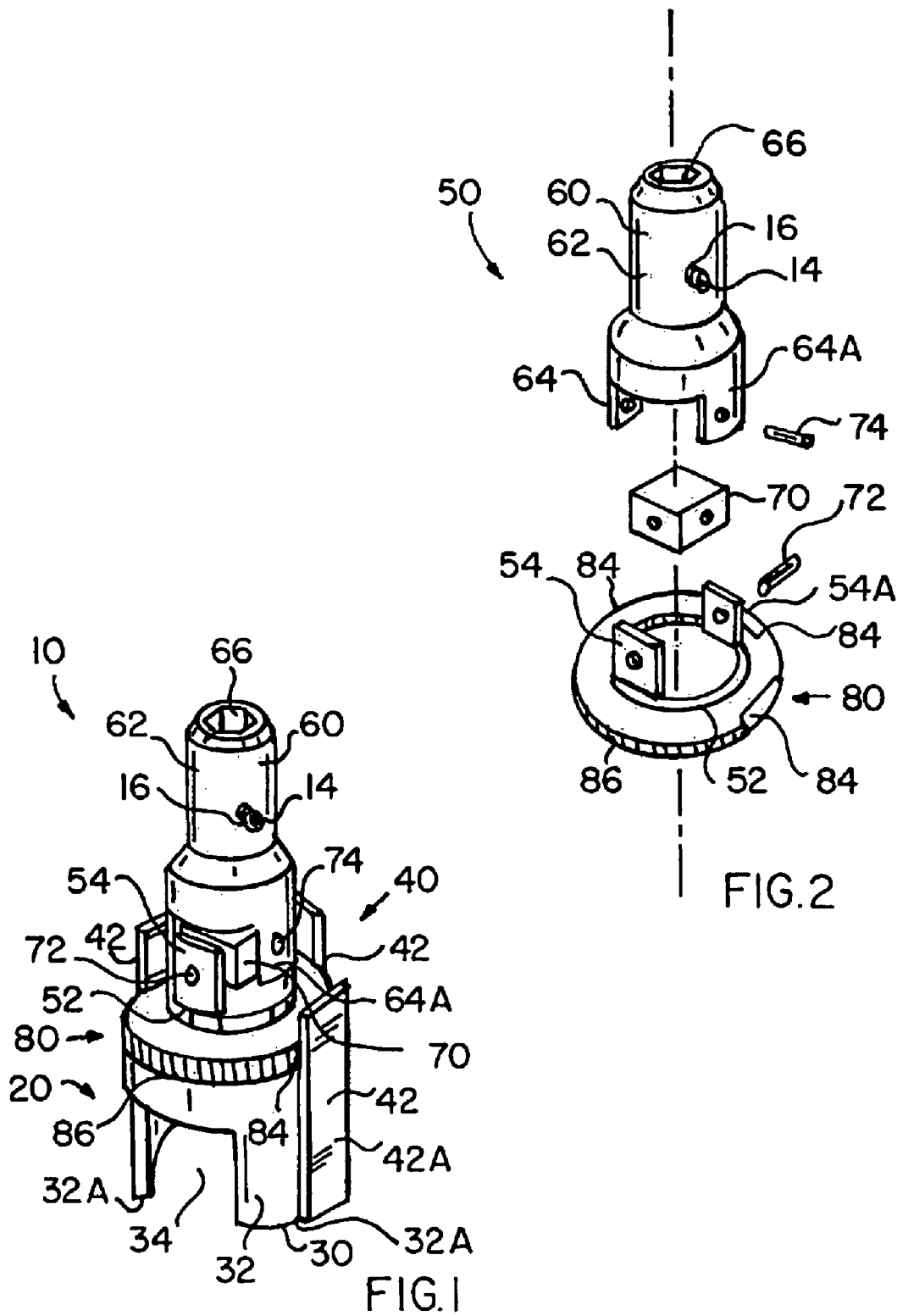

FISHING REEL WINDING APPARATUS

FILING HISTORY

This application continues from provisional patent application Ser. No. 61/006,712 filed on Jan. 29, 2008.

BACKGROUND OF THE INVENTION

1. Field of the Invention

The present invention relates generally to the field of fishing equipment and accessories such as for sport fishing. More specifically the present invention relates to a fishing reel winding apparatus for removably interconnecting a winding handle of a fishing reel and the chuck of an electric drill so that operation of the drill rapidly rotates the reel to wind fishing line onto the reel. A conventional fishing reel includes a spool-retaining cradle structure having opposing panels interconnected at their periphery by a panel linking members, a spool axle on which a spool is fixedly mounted and which extends between and is rotatably mounted to the cradle panels and which passes through an axle port in one of the cradle panels to a spool handle hub on the outward side of the cradle panel, from which a spool winding handle radially extends.

The fishing reel winding apparatus includes a chuck gripping stem for insertion into and engagement by a drill chuck and a handle hub engagement assembly including a hub receiving cup having a cup side wall with a lateral handle passing notch and a cup bottom wall drivably connected directly or indirectly to the chuck gripping stem. The abutment of the sides of the handle passing notch with the spool winding handle imparts rotational motion to the spool winding handle when the apparatus is rotated by an electric drill. The hub receiving cup preferably includes a spool handle hub engaging mechanism for removably retaining a spool handle hub within the hub receiving cup until release of the apparatus from the fishing reel is desired.

A universal joint preferably is provided between the chuck gripping stem and the hub receiving cup for ease of apparatus use. The handle hub engaging mechanism preferably includes a series of spring-biased, L-shaped handle hub engaging arms which are pivotally secured to the cup side wall rim with arm pivot pins, with an arm first segment of the L-shape extending axially along the outer surface of the cup side wall from the cup rim, and an arm second segment extending over the cup rim. An engaging arm lock preferably is provided including a locking ring having three equally spaced arm receiving notches in the ring outer periphery. The locking ring is rotatably mounted around the cup neck segment and retained on the cup neck segment by outward ring retaining protrusion. Rotation of the locking ring relative to the cup neck segment aligns the arm receiving notches with all three arm first segments simultaneously to permit pivoting of all of the engaging arms to release a spool handle hub, and further rotation of the locking ring relative to the cup neck segment takes all of the arm receiving notches out of alignment with the first arm segments so that the ring periphery blocks pivoting of the engaging arms to release a spool handle hub and the apparatus remains securely operationally affixed to the spool handle hub during use. The ring outer periphery between the arm receiving notches preferably is knurled for ease of gripping and turning with user fingers.

2. Description of the Prior Art

The winding of fishing reels to gather released line is the time consuming and tedious part of recreational fishing. This is particularly so in competitive sport fishing where the spools on the reels are often quite large and release great lengths of fishing line.

It is thus an object of the present invention to provide a fishing reel winding apparatus which can engage existing fishing reels and provide powered winding of the spool for fast and effortless gathering of released line.

It is another object of the present invention to provide such a fishing reel winding apparatus which provides powered winding by interconnecting the spool winding handle of a standard fishing reel with the chuck of an electric drill.

It is still another object of the present invention to provide such a fishing reel winding apparatus which is compact to easily fit into any fishing box, as well as into the hip pocket a sportsman.

It is finally an object of the present invention to provide such a fishing reel winding apparatus which is easy to use, sturdy, reliable and relatively inexpensive to manufacture.

SUMMARY OF THE INVENTION

The present invention accomplishes the above-stated objectives, as well as others, as may be determined by a fair reading and interpretation of the entire specification.

A fishing reel winding apparatus is provided for use with a fishing reel including a spool-retaining structure in which a spool is mounted and the spool connects to a spool handle hub from which a spool winding handle radially extends for removably interconnecting a spool winding handle and the chuck of an electric drill, so that operation of the electric drill rotates the chuck and the reel to wind fishing line onto the spool, the fishing reel winding apparatus including: a chuck gripping stem for insertion into and engagement by a drill chuck and a handle hub engagement assembly drivably connected to the chuck gripping stem.

The handle hub engagement assembly preferably includes a hub receiving cup having a cup side wall with a lateral handle receiving notch and a cup bottom wall drivably connected to the chuck gripping stem, where abutment of the sides of the handle receiving notch with the spool winding handle imparts rotational motion to the spool winding handle when the apparatus is rotated by a drill engaging the chuck gripping stem. The hub receiving cup preferably includes a spool handle hub engaging mechanism for removably retaining a spool handle hub within the hub receiving cup until release of the apparatus from the fishing reel is desired.

The apparatus preferably additionally includes a universal joint between and connected to the chuck gripping stem and the hub receiving cup. The apparatus preferably still additionally includes a cup neck segment extending from the hub receiving cup opposite the cup side wall, where the universal joint includes: two spaced apart and diametrically opposed first joint tabs with tab ports extending from the cup neck segment; and two spaced apart and diametrically opposed second joint tabs with tab ports extending from the stem socket fitting snugly over the chuck gripping stem; and a pivot block located between the first joint tabs and the second joint tabs and a block pin extending from the pivot block pivotally into tab ports in each of the first joint tabs and in the second joint tabs, to create a universal pivoting action. The cup neck segment preferably has a smaller diameter than the hub receiving cup.

The cup includes a cup outer surface and a cup interior and a cup rim, and the handle hub engaging mechanism preferably includes at least one L-shaped handle hub engaging arm pivotally secured to the cup side wall with an arm pivot pin, the at least one engaging arm having a first arm segment and a second arm segment, where the arm first segment of the L-shaped hub engaging arm extends substantially along the outer surface of the cup side wall from the cup rim toward the cup bottom wall, and an arm second segment extending over the cup rim, and where the engaging arm is biased with arm biasing mechanism fitted around the pivot pin secured to the cup side wall and the given engaging arm; so that the arm first segment is biased to extend over and partly across the cup interior to obstruct and block removal of a spool handle hub from within the cup until winding is completed and apparatus removal is desired, whereupon the arm first segment is manually pressed toward the cup side wall to pivot the arm second segment out of alignment with the cup interior so that the spool handle hub is freed to slide out of the hub receiving cup. The apparatus optionally includes at least three of the hub engaging arms. The apparatus preferably additionally includes an engaging arm lock including a locking ring having a ring outer periphery with arm receiving notches in the ring outer periphery, the locking ring being rotatably mounted and retained around the cup; so that rotation of the locking ring relative to the cup aligns the arm receiving notches with all of the arm first segments to permit pivoting of the engaging arms to release a spool handle hub, and further rotation of the locking ring relative to the cup takes the arm receiving notches out of alignment with the arm first segments and the ring periphery blocks pivoting of the engaging arms to release a spool handle hub and the apparatus remains securely and operationally affixed to the spool handle hub during use. The portions of the ring outer periphery between the arm receiving notches preferably is knurled for ease of gripping and by turning with user fingers.

The chuck gripping stem optionally has a hexagonal cross-section for more secure chuck engagement. The stem socket preferably has a corresponding interior hexagonal cross-section sized to closely receive and fit the chuck gripping stem. The apparatus preferably additionally includes a set screw passing laterally through a threaded set screw port in the stem socket side wall for releasably securing the chuck gripping stem within the stem socket.

A fishing reel and fishing reel winding apparatus is further provided, including a fishing reel having a spool-retaining structure in which a spool is mounted and the spool connects to a handle hub from which a spool winding handle radially extends; and a chuck gripping stem for insertion into and engagement by a drill chuck and a handle hub engagement assembly drivably connected to the chuck gripping stem, for removably interconnecting a spool winding handle and the chuck of an electric drill, so that operation of the electric drill rotates the chuck and the reel to wind fishing line onto the spool.

A fishing reel and fishing reel winding apparatus is still further provided, including an electric drill having a chuck; a fishing reel including a spool-retaining structure in which a spool is mounted and the spool connects to a handle hub from which a spool winding handle radially extends; and a chuck gripping stem for insertion into and engagement by the drill chuck and a handle hub engagement assembly drivably connected to the chuck gripping stem, for removably interconnecting a spool winding handle and the chuck of the electric drill, so that operation of the electric drill rotates the chuck and the reel to wind fishing line onto the spool.

BRIEF DESCRIPTION OF THE DRAWINGS

Various other objects, advantages, and features of the invention will become apparent to those skilled in the art from the following discussion taken in conjunction with the following drawings, in which:

FIG. 1 is a side perspective view of the preferred embodiment of the fishing reel winding apparatus.

FIG. 2 is an exploded view of the universal joint of the embodiment of FIG. 1.

Prior Art

DETAILED DESCRIPTION OF THE PREFERRED EMBODIMENTS

Figure 3:
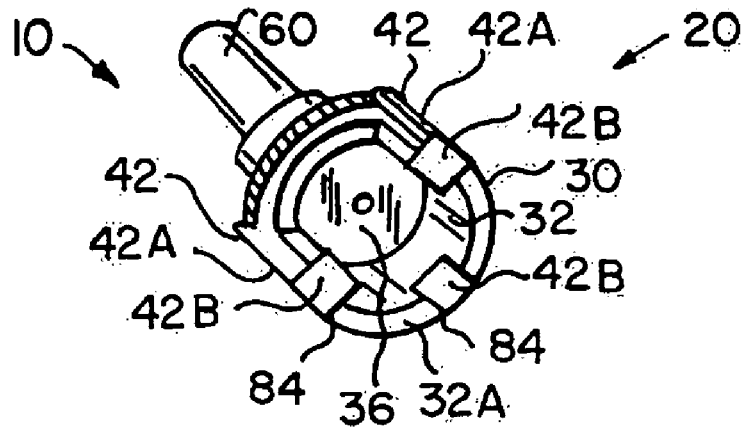
FIG. 3 is a perspective view of the embodiment of FIG. 1 from the hub receiving cup end of the apparatus.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 4:
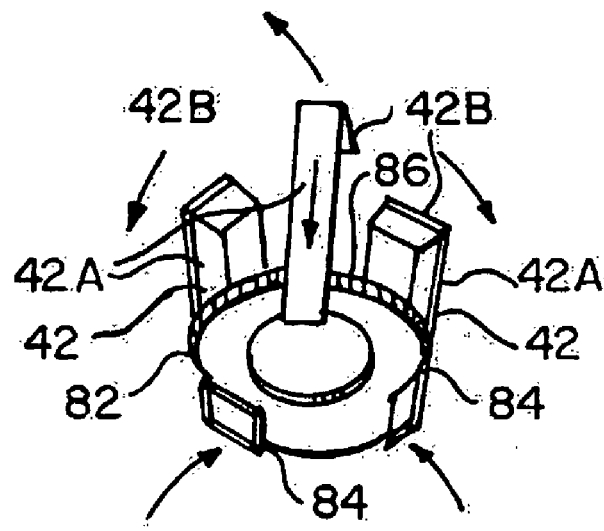
FIG. 4 is a perspective view of the hub engaging arms and locking ring in working relation, with the arm receiving notches aligned with the hub engaging arms permitting the hub engaging arms to pivot and release a spool hub. The arm biasing springs also are shown.
Figure 7:
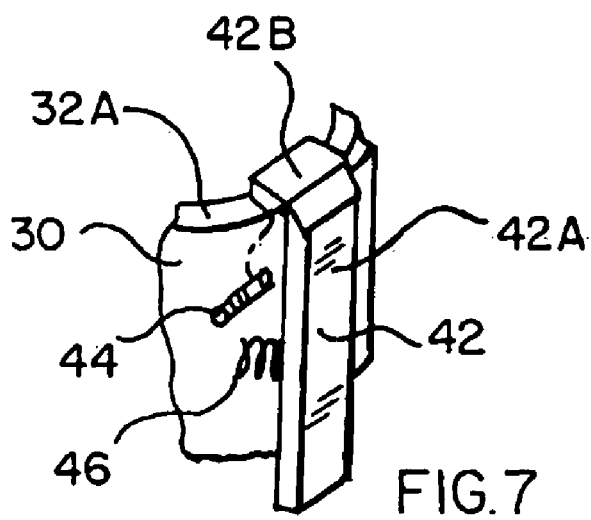
FIG. 7 is a broken away view of the cup wall, a hub engaging arm and the pin in the cup wall on which the arm is pivotally mounted.
Figure 5:
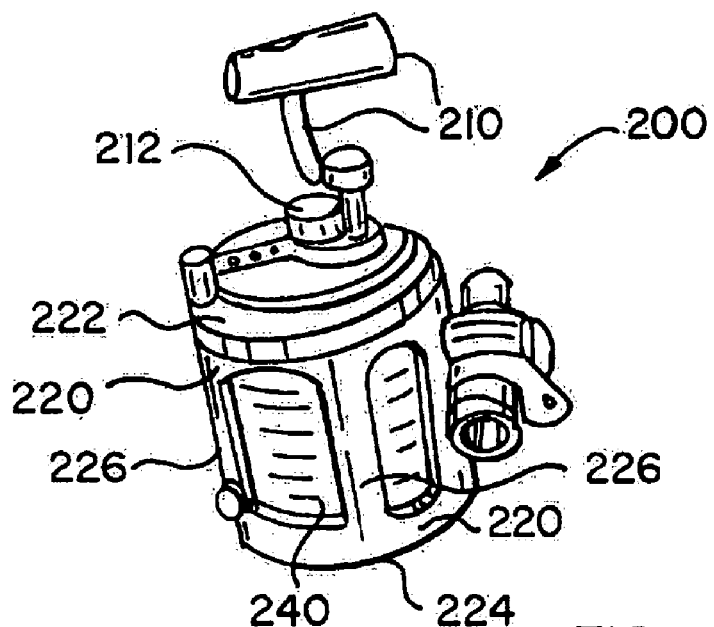
FIG. 5 is perspective view of a conventional fishing reel onto which the present winding apparatus may be mounted.
Figure 6:
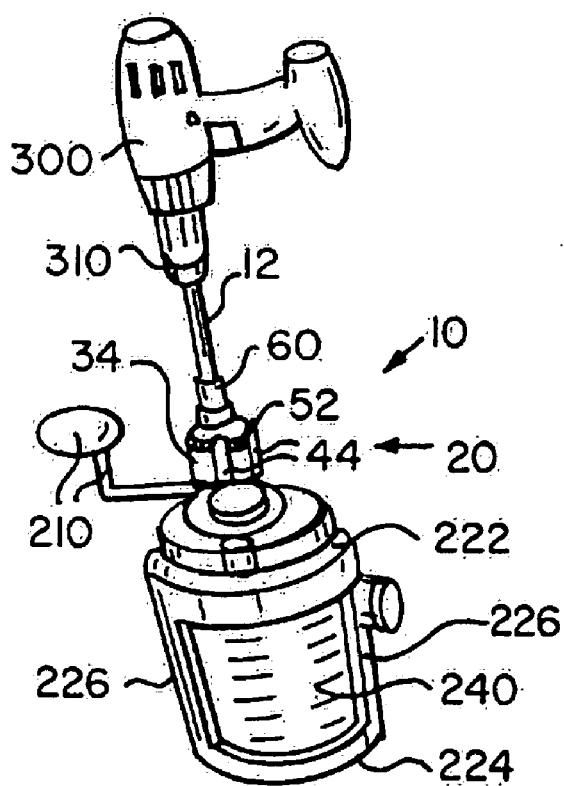
FIG. 6 is a perspective view of the fishing reel of FIG. 5 with the present winding apparatus mounted to its winding hub and an electric drill engaging the chuck stem to rotate the apparatus and the fishing reel spool.

Referring to FIGS. 1-7, a fishing reel winding apparatus 10 is disclosed for removably interconnecting a spool winding handle 210 of a fishing reel 200 and the chuck 310 of an electric drill 300 so that operation of the drill 300 rapidly rotates the reel 200 to wind fishing line onto the reel 200.

A conventional fishing reel 200 includes a spool-retaining cradle structure 220 having opposing panels 222 and 224 interconnected at their periphery by panel linking members 226, a spool axle (not shown) on which a spool 240 is fixedly mounted and which extends between and is rotatably mounted to the cradle panels 222 and 224 and passes through an axle port (not shown) in one of the cradle panels 222 or 224 to a spool handle hub 212 mounted to the spool axle on the outward side of the cradle panel 222, from which spool winding handle 210 radially extends.

The fishing reel winding apparatus 10 includes a chuck gripping stem 12 for insertion into and engagement by a drill chuck 310 and a handle hub engagement assembly 20 including a hub receiving cup 30 having a cup side wall 32 with a lateral handle passing notch 34 and a cup bottom wall 36 drivably connected directly or indirectly to the chuck gripping stem 12. The abutment of the sides of the handle passing notch 34 with the spool winding handle 210 imparts rotational motion to the spool winding handle 210 when the apparatus 10 is rotated by an electric drill 300. The hub receiving cup 30 preferably includes a handle hub engaging mechanism 40 for removably retaining a spool handle hub 212 of a fishing reel 200 within the hub receiving cup 30 until release of the apparatus 10 from the fishing reel 200 is desired.

A universal joint 50 preferably is provided between the chuck gripping stem 12 and the hub receiving cup 30 for ease of apparatus 10 use. The universal joint 50 preferably is of conventional design. The hub receiving cup 30 preferably includes a reduced diameter cup neck segment 52 protruding outwardly from the cup bottom wall 36 which includes two spaced apart and diametrically opposed first joint tabs 54 and 54A. A stem socket 60 having a stem socket side wall 62 and a stem socket opening 66 preferably protrudes axially outwardly from the cup neck segment 52 preferably fits snugly over the chuck gripping stem 12 and includes two spaced apart and diametrically opposed second joint tabs 64 and 64A. A pivot block 70 is provided between the first joint tabs 54 and 54A and between the second joint tabs 64 and 64A and a first block pin 72 extends from the pivot block 70 pivotally into tab ports P each of the first joint tabs 54 and 54A and a second block pin 74 preferably extends into tab ports P in the second joint tabs 64 and 64A, to create the universal pivoting action.

The handle hub engaging mechanism 40 preferably includes a series of L-shaped handle hub engaging arms 42 which are pivotally secured to the cup side wall rim 32A with arm pivot pins 44, with an arm first segment 42A of the L-shape extending axially along the outer surface of the cup side wall 32 from the cup rim 32A, and an arm second segment 42B extending over the cup rim 32A. The engaging arms 42 preferably each are biased with an arm biasing spring 46 preferably in the form of a coil spring secured in its compressed mode between the first arm segment 42A of the given hub engaging arm 42 and the cup side wall 32 so that the arm first segment 42A is biased to extend over and partly across the interior of the hub receiving cup 30 to obstruct and block removal of a spool handle hub 212 from within the cup 30 until winding is completed and apparatus 10 removal is desired. Then the arm first segments 42A are manually pressed toward the cup side wall 32 to pivot the arm second segments 42B out of alignment with the cup 30 interior so that the spool handle hub 212 is freed to slide out of the hub receiving cup 30. Three hub engaging arms 42 preferably are provided, although other numbers of hub engaging arms 42 are contemplated.

An engaging arm lock 80 preferably is provided including a locking ring 82 having three equally spaced arm receiving notches in the ring outer periphery 86. The locking ring 82 is rotatably mounted around the cup neck segment 52 and retained on the cup neck segment 52 by outward ring retaining protrusions. Rotation of the locking ring 82 relative to the cup neck segment 52 aligns the arm receiving notches 84 with all three arm first segments 42A simultaneously to permit pivoting of all of the engaging arms 42 to release a spool handle hub 212, and further rotation of the locking ring 82 relative to the cup neck segment 52 takes all of the arm receiving notches 84 out of alignment with the arm first segments 42A so that the ring outer periphery 86 blocks pivoting of the engaging arms 42 to release a spool handle hub 212 and the apparatus 10 remains securely operationally affixed to the spool handle hub 212 during use. The ring outer peripheral 86 between the arm receiving notches 84 preferably is knurled for ease of gripping and turning with user fingers.

The chuck gripping stem 12 preferably is hexagonal cross-section for more rotationally secure engagement by a drill chuck 310. The stem socket 60 preferably has a corresponding interior hexagonal cross-section sized to closely receive and fit the chuck gripping stem 12. A set screw 14 preferably passes laterally through a threaded set screw port 16 in the stem socket side wall 62 and releasably secures the chuck gripping stem 12 within the stem socket 60.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A fishing reel winding apparatus for use with a fishing reel comprising a spool-retaining structure in which a spool is mounted and the spool connects to a spool handle hub from which a spool winding handle radially extends for removably interconnecting a spool winding handle and a chuck of an electric drill, such that operation of the electric drill rotates the chuck and the reel to wind fishing line onto the spool, comprising:

a chuck gripping stem for insertion into and engagement by a drill chuck and a handle hub engagement assembly drivably connected to said chuck gripping stem;

a universal joint between and connected to said chuck gripping stem and said hub receiving cup;

a cup neck segment extending from said hub receiving cup opposite said cup side wall, wherein said universal joint comprises two spaced apart and diametrically opposed first joint tabs with tab ports extending from said cup neck segment; and two spaced apart and diametrically opposed second joint tabs with tab ports extending from a stem socket fitting snugly over said chuck gripping stem; and a pivot block located between said first joint tabs and said second joint tabs and a block pin extending from said pivot block pivotally into tab ports in each of said first joint tabs and in said second joint tabs, to create a universal pivoting action;

wherein said cup comprises a cup outer surface, a cup interior and a cup rim, and wherein said means for removably retaining a spool handle hub within said hub receiving cup of said handle hub engaging mechanism comprises: at least one L-shaped handle hub engaging arm pivotally secured to said cup side wall with an arm pivot pin, said at least one engaging arm having a first arm segment and a second arm segment, wherein said arm first segment of said L-shaped hub engaging arm extends substantially along the outer surface of said cup side wall from said cup rim toward said cup bottom wall, and an arm second segment extending over said cup rim, and wherein said engaging arm is biased with arm biasing means fitted between said cup side wall and the given said engaging arm; such that said arm first segment is biased to extend over and partly across said cup interior to obstruct and block removal of a spool handle hub from within said cup until winding is completed and apparatus removal is desired, whereupon said arm first segment is manually pressed toward said cup side wall to pivot said arm second segment out of alignment with said cup interior such that the spool handle hub is freed to slide out of said hub receiving cup.

2. The apparatus of claim 1, comprising at least three said hub engaging arms.

3. The apparatus of claim 1, additionally comprising an engaging arm lock comprising a locking ring having a ring outer periphery with arm receiving notches in said ring outer periphery, said locking ring being rotatably mounted and retained around said cup;

such that rotation of said locking ring relative to said cup aligns said arm receiving notches with all of said arm first segments to permit pivoting of said engaging arms to release a spool handle hub, and further rotation of said locking ring relative to said cup takes said arm receiving notches out of alignment with said arm first segments and said ring periphery blocks pivoting of said engaging arms to release a spool handle hub and said apparatus remains securely and operationally affixed to the spool handle hub during use.

4. The apparatus of claim 3, wherein the portions of said ring outer periphery between said arm receiving notches is knurled for ease of gripping and by turning with user fingers.

* * * * *